United States Patent [19]

Miyoshi et al.

[11] 4,414,270
[45] Nov. 8, 1983

[54] MAGNETIC RECORDING MEDIUM

[75] Inventors: Takahito Miyoshi; Toshimitu Okutu; Goro Akashi; Tatsuji Kitamoto; Masaaki Fujiyama, all of Odawara, Japan

[73] Assignee: Fuji Photo Film Co., Ltd., Kanagawa, Japan

[21] Appl. No.: 345,121

[22] Filed: Feb. 2, 1982

[30] Foreign Application Priority Data

Feb. 2, 1981 [JP] Japan .................................. 56-14032

[51] Int. Cl.³ .............................................. B32B 5/16
[52] U.S. Cl. ..................................... 428/325; 428/328; 428/329; 428/330; 428/331; 428/336; 428/694; 428/900
[58] Field of Search ............................... 427/127–132, 427/48; 252/62.54; 428/900, 694, 336, 402, 404, 325, 328, 329, 330, 331

[56] References Cited

U.S. PATENT DOCUMENTS

| | | | |
|---|---|---|---|
| 3,293,066 | 12/1966 | Haines | 117/68 |
| 3,916,039 | 10/1975 | Akashi et al. | 427/128 |
| 4,135,032 | 1/1979 | Akashi et al. | 428/328 |

*Primary Examiner*—Bernard D. Pianalto
*Attorney, Agent, or Firm*—Sughrue, Mion, Zinn, Macpeak & Seas

[57] ABSTRACT

A magnetic recording medium comprising a magnetic layer on one surface of a non-magnetic base and a back coating on the other surface thereof which is not thicker than $2\mu$ and which contains inorganic particles and a binder is disclosed. The inorganic particles have an average size between 0.02 and $5\mu$ and a Mohs hardness of 2.5 to 9.0, and the surface of the back coating has a center line average roughness (Ra) of 0.024 or less and the surface of the magnetic layer has a center line average roughness (Ra) of 0.02.

6 Claims, No Drawings

MAGNETIC RECORDING MEDIUM

FIELD OF THE INVENTION

The present invention relates to a magnetic recording medium, more particularly, to a magnetic tape that has a low friction coefficient, a high S/N ratio, improved running durability which is free from waving and folding and scraped back surface and which can be wound or rewound in a regular fashion.

BACKGROUND OF THE INVENTION

Audio, video and computer magnetic recording tapes have magnetic recording layers that are given a smooth surface to provide them with higher sensitivity particularly higher output in the high-frequency range. However, such smooth surfaced magnetic recording tapes cannot be wound or rewound smoothly and variations in tape tension reduces the running ability of the tape and causes fluctuations in tape output. Further, such tapes are easily deformed or damaged.

To overcome the above defects, a magnetic recording tape has been proposed which has a back coating on the surface of the non-magnetic base opposite the magnetic layer. However, such a conventional back coating needs improvement since it is not resistant to scraping, suffers from increased friction coefficient and tape edge bends (waving and folding); for this reason, such a tape winds or rewinds in an irregular fashion.

It is generally accepted that when a magnetic recording medium provided with a back coating for improved running properties and durability during running is rolled into a tape pack or when sheets of such a medium are stacked, unevenness in the back coating is transferred to the surface of the magnetic layer and damages the surface thereof, resulting in a reduction in magnetic properties, especially the signal to noise (S/N) ratio of the magnetic recording medium. To provide better running properties, the back coating is often given a rough surface, and thus when a roll or sheets of such a magnetic medium are stored or left to stand for extended periods of time, unevenness in the back coating is transferred to the surface of the magnetic layer which results in reducing the S/N ratio.

SUMMARY OF THE INVENTION

One object of the present invention is to provide a magnetic recording medium that has a low friction coefficient but which exhibits good running durability and which can be wound or rewound in a regular fashion.

Another object of the present invention is to provide a magnetic recording medium having a back coating that does not reduce the S/N ratio of the magnetic recording medium.

These objects of the present invention are achieved by a magnetic recording medium having a magnetic layer on one surface of a non-magnetic base and a back coating on the other surface, which back coating has a thickness of about $0.2\mu$ to about $2\mu$ and which contains inorganic particles and a binder, wherein the inorganic particles have an average size between 0.02 and $0.5\mu$ and a Mohs hardness of 2.5 to 9.0, further wherein the surface of the back coating has a center line average roughness (Ra) of 0.024 or less for a cut-off value of 0.08 mm and the surface of the magnetic layer has a center line average roughness (Ra) of 0.02 or less for a cut-off value of 0.08 mm.

DETAILED DESCRIPTION OF THE INVENTION

One feature of the present invention is that it uses fine inorganic particles having a certain range of size and hardness, i.e., they are required to have an average size of 0.02 to $0.5\mu$, preferably 0.02 to $0.2\mu$, and have a Mohs hardness of 2.5 to 9.0. Specific examples of the inorganic materials used are tungsten disulfide, molybdenum disulfide, boron nitride, $SiO_2$, $CaCO_3$, $Al_2O_3$, $Fe_2O_3$, $TiO_2$, MnO, ZnO, CaO, and $SnO_2$; $SiO_2$, $CaCO_3$ and $TiO_2$ are preferred, and $CaCO_3$ is particularly preferred. These inorganic particles are used in such an amount that the weight ratio to the binder is preferably from 0.1 to 4.0, more particularly from 0.1 to 2.5, most preferably from 0.8 to 1.5.

The binder for the back coating can be any material conventionally used in the art, such as thermoplastic resins, thermosetting or curable resins, and mixtures thereof. It is desired that the binders, used alone or in combination, have a glass transition temperature (Tg) of about 40° C. to about 120° C., more preferably 60° C. or higher.

Specific examples of the binder are thermoplastic resins such as vinyl chloride/vinyl acetate copolymers, vinyl chloride/vinylidene chloride copolymers, vinyl chloride/acrylonitrile copolymers, acrylic ester/acrylonitrile copolymers, acrylic ester/vinylidene chloride copolymers, acrylic ester/styrene copolymers, methacrylic ester/acrylonitrile copolymers, methacrylic ester/vinylidene chloride copolymers, methacrylic ester/styrene copolymers, urethane elastomers, polyvinyl fluoride, vinylidene chloride/acrylonitrile copolymers, butadiene/acrylonitrile copolymers, polyamide resins, polyvinyl butyral, cellulosic resins (e.g., cellulose acetate butyrate, cellulose diacetate, cellulose propionate, nitrocellulose), styrene/butadiene copolymers, polyester resins, chlorovinyl ether/acrylic ester copolymers, amino resins and various rubber resins; and thermosetting or curable resins such as phenolic resins, epoxy resins, e.g., an epoxy resin comprising epichlorohydrin and bisphenol A, polyurethane curable resins, urea resins, melamine resins, alkyd resins, acrylic curable resins, polyisocyanates, e.g., a polyisocyanate comprising tolylene diisocyanate and trimethylolpropane, and polyamines.

The magnetic coating composition can be prepared by a conventional technique, e.g., by charging a mixer with a ferromagnetic powder, a binder, a dispersing agent, a lubricating agent, an abrasive, an antistatic agent, a solvent and other additives and dispersing these components. In preparing the coating composition, ferromagnetic powder and other components may be added simultaneously or separately to the mixer. For example, the ferromagnetic powder can be added to a solvent containing a dispersing agent, followed by mixing for a predetermined period, and then other components can be added to the resulting dispersion to obtain a magnetic coating composition. The technique for mixing and dispersing these components is disclosed by T. C. Patton, *Paint Flow and Pigment Dispersion* (1964, John Wiley & Sons Co.) and U.S. Pat. Nos. 2,855,156 and 2,581,414. The magnetic coating composition can be applied on a non-magnetic base using a conventional technique such as doctor coating, blade coating, air knife coating, squeeze coating, reverse roll coating and gravure coating.

The back coating can be formed in a similar manner to that used in providing a magnetic layer. In particular, a coating composition for the back coating can be prepared using a ball mill, sand grinder, kneader, etc. The time required for dispersing the coating composition varies depending upon the type of apparatus used for dispersing the coating composition and such procedure can be continued until a predetermined roughness is obtained.

A magnetic recording medium that has an even better S/N ratio, running durability and which can be wound in a regular fashion can be provided by controlling the coefficient of friction ($\mu$) between the magnetic layer and the back coating to be 0.30 or less for a rub speed of 0.8 mm/sec. To increase the recording density per unit volume, the thickness of the back coating is set such that the total thickness of the magnetic recording medium (consisting of the magnetic layer which is generally in the range of 3 to 10$\mu$, base which is generally in the range of 7 to 25$\mu$ and back coating) is as thin as possible. Thus, the back coating has a thickness of 2$\mu$ or less, preferably 0.4 to 1$\mu$.

Another feature of the present invention is that the surface of the magnetic layer has a center line average roughness (Ra) of 0.02$\mu$ or less for a cut-off value of 0.08 mm and the surface of the back coating has a center line average roughness of 0.024$\mu$ or less for the same cut-off value (0.08 mm), and the back coating layer is as thin as possible. If these requirements are met, a magnetic recording medium wherein unevenness of the back coating layer is not transferred onto the surface of the magnetic layer is produced.

According to prior art techniques, the back coating layer tends to be broken when it is thin (i.e., the back coating layer is scraped off when the magnetic recording medium is running); this problem is eliminated in the magnetic recording medium of this invention. Further, a magnetic recording medium having the back coating layer of this invention has the advantage in that it can be used in high-density recording at a wavelength of 1.3$\mu$ without reducing the video S/N ratio.

The magnetic recording medium of this invention can contain optional additives, for example, carbon black powder or graphite in the back coating layer. Examples of such additives and specific methods for incorporating these additives are disclosed in detail in, for example, Japanese Patent Application (OPI) No. 108804/77 (the term "OPI" as used herein refers to a "published unexamined Japanese patent application"). Further, the magnetic layer can be a thin metal film that is formed by vapor deposition.

The present invention is now illustrated in greater detail by reference to the following example which is given here for illustrative purposes only and is by no means intended to limit its scope. In the example, all parts are by weight.

EXAMPLE 1

A magnetic layer containing Co-containing $\gamma$-iron oxide particles was formed on one surface of a polyethylene terephthalate base 14$\mu$ thick and a back coating was formed on the other surface. The magnetic layer had a dry thickness of 5$\mu$, and the back coating had a dry thickness of 1$\mu$. The back coating was formed by applying a dispersion of one of the particulate inorganic materials indicated in Table 1 in binder compositions A, B or C as described below. The surface roughness of the back coating was controlled by varying the period of time that the particulate inorganic materials were dispersed in the binder.

| | parts |
|---|---|
| Binder Composition A | |
| Vinyl Chloride/Vinyl Acetate Copolymer (1000 G of Denki Kagaku Kogyo K.K.) | 5 |
| Polyurethane [Reaction Product of Polyester Diol (Neopentyl Glycol, Butadiene Glycol and Adipic Acid) and Diphenylmethane-4,4'-Diisocyanate] | 50 |
| Methyl Ethyl Ketone | 300 |
| Binder Composition B | |
| Nitrocellulose (Degree of Nitration: 11.5–12.2%) | 15 |
| Polyurethane (Same as Above) | 30 |
| Polyisocyanate (Reaction Product of Tolylene Diisocyanate and Trimethylolpropane) | 15 |
| Methyl Ethyl Ketone | 300 |
| Binder Composition C | |
| Nitrocellulose (Degree of Nitration: 11.5–12.2%) | 25 |
| Polyurethane (Same as Above) | 10 |
| Polyisocyanate (Reaction Product of Tolylene Diisocyanate and Trimethylolpropane) | 25 |
| Methyl Ethyl Ketone | 300 |

One hundred parts of the respective inorganic materials identified in Table 1 were dispersed in these binder compositions.

Five tape samples were prepared in the manner described above and they were each subjected to the following tests, the results of which are given in Tables 1 and 2.

Test 1

A virgin tape was run 100 passes through a VHS video deck and its running durability was compared with its initial value by measuring the tension both at the entrance ($T_1$) and at the exit ($T_2$) of the rotary VHS head. The tape was also checked for any fluctuation in tape output.

Test 2

A virgin tape was run 100 passes as per above Test 1 and its dynamic friction coefficient ($T_2/T_1$) against a stainless steel pole (3.3 cm/sec) was checked for the magnetic layer side and the back coating side. The result was compared with its initial dynamic friction coefficient ($T_2/T_1$).

Test 3

A virgin tape was run 100 passes on a VHS video deck and checked for any back coating wear and damage to the magnetic recording layer surface.

Test 4

A virgin tape was run 10 passes and then rewound. It was then run 100 passes and then rewound. Comparison was made as to how neatly the two tapes could be rewound.

Test 5

A virgin tape was run 100 passes and the dynamic friction coefficient ($\mu$) between the magnetic layer and the back coating at a rub speed of 0.8 mm/sec was compared with its initial dynamic friction coefficient ($\mu$).

magnetic tape that has good S/N ratio, low VTR deck tension and better durability to running and which can

TABLE 1

| Sample No. | Binder Composition | Inorganic Powder (average particle size) ($\mu$) | Ra of Back Coating (cut-off value: 0.08 mm) ($\mu$) | Test 5 Coefficient of Friction between Back Coating and Magnetic Layer ($\mu$) | Test 1 Initial S/N Ratio (dB) | Fluctuation in Output after 100 Passes (dB) | Deck Tension of Virgin Tape ($T_2/T_1$) | Deck Tension after 100 Passes ($T_2/T_1$) |
|---|---|---|---|---|---|---|---|---|
| 1 | A | Talc*1 (0.5) | 0.04 | 0.28 | −2.0 | 1.8 | 95/38 | 95/38 |
| 2 | A | Calcium*2 Carbonate (0.07) | 0.03 | 0.35 | −1.0 | 1.2 | 98/40 | 98/38 |
| 3 | A | Calcium*2 Carbonate (0.07) | 0.02 | 0.37 | 0 | 1.0 | 100/42 | 98/40 |
| 4 | B | Calcium*2 Carbonate (0.07) | 0.02 | 0.27 | +2.0 | 0.3 | 95/38 | 90/35 |
| 5 | C | Calcium*2 Carbonate (0.07) | 0.02 | 0.25 | +3.0 | 0.2 | 90/37 | 88/33 |

| Sample No. | Test 2 $\mu$ of Virgin Tape Magnetic Surface | Back Surface | $\mu$ of Tape after 100 Passes Magnetic Surface | Back Surface | Test 3 Tape Wear*4 after 100 Passes | Tape Damage*5 (edge folding and waving) after 100 Passes | Test 4 Regularity of Wound Tape*3 10 Passes | 100 Passes |
|---|---|---|---|---|---|---|---|---|
| 1 | 0.35 | 0.22 | 0.33 | 0.23 | 5 | 5 | 3 | 2 |
| 2 | 0.37 | 0.24 | 0.35 | 0.24 | 5 | 5 | 2 | 1 |
| 3 | 0.38 | 0.27 | 0.35 | 0.27 | 2 | 2 | 4 | 2 |
| 4 | 0.34 | 0.20 | 0.32 | 0.19 | 2 | 1 | 5 | 4 |
| 5 | 0.32 | 0.18 | 0.30 | 0.17 | 1 | 0 | 5 | 5 |

*1 Mohs hardness: 1.0
*2 Mohs hardness: 3.0
*3 Regularity of wound tape was evaluated on a 5-point basis, wherein 5 was the best and 1 was the poorest.
*4 Number of tapes having back coating wear observed visually of the 10 tapes tested.
*5 Number of tapes having edge folding and waving of the 10 tapes tested.

TABLE 2

Thin Metal Film Used as Magnetic Layer

| Back Coating | Regularity of Wound Tape | Initial S/N Ratio (dB) | Decrease in S/N Ratio after 1 Month Standing | $\mu$ of Virgin Tape Magnetic Surface | Back Surface | Deck Tension of Virgin Tape ($T_2/T_1$) | Deck Tension after 100 Passes |
|---|---|---|---|---|---|---|---|
| Absent Binder Composition A | Poor | 0 | −3.0 | 0.18–0.22 | 0.25–0.32 | 200/50 | 180/50 |
| Inorganic Powder: Talc Ra: 0.04$\mu$ (cut-off value: 0.08 mm) Binder Composition C | Good | −1.0 | −1.0 | Same as above | 0.15–0.20 | 90/50 | 100/50 |
| Inorganic Powder: CaCO$_3$ Ra: 0.02$\mu$ (cut-off value: 0.08 mm) | Good | +3.0 | ±0 | Same as above | 0.11–0.15 | 80/50 | 90/50 |

As the Tables show, a magnetic tape that with good running durability without any sacrifice in the S/N ratio and which sustains little damage can be produced using a thin back coating which has incorporated therein filler particles having a Mohs hardness of 2.5 to 9.0, and an average size of 0.02 to 0.5$\mu$ and whose surface has a center line average roughness (Ra) of 0.024$\mu$ or less for a cut-off value of 0.08 mm. As another advantage, the tape has a low coefficient of friction between the back coating and the magnetic layer. Using a binder mixture having high glass transition temperature, a wound or rewound in a regular fashion can be produced.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a magnetic layer on one surface of a non-magnetic base and a back coating on the other surface thereof which is not thicker than 2μ and which comprises inorganic particles and binder, wherein the inorganic particles are selected from the group consisting of tungsten disulfide, molybdenum disulfide, boron nitride, $SiO_2$, $CaCO_3$, $Al_2O_3$, $Fe_2O_3$, $TiO_2$, MnO, ZnO, CaO, and $SnO_2$ and have an average size between 0.02 and 0.5μ and a Mohs hardness of 2.5 to 9.0, and the surface of the back coating has a center line average roughness (Ra) of 0.024μ or less and the surface of the magnetic layer has a center line average roughness (Ra) of 0.02μ or less.

2. The magnetic recording medium as claimed in claim 1, wherein said back coating has a thickness of 2μ or less.

3. The magnetic recording medium as claimed in claim 1, wherein the binder has a glass transition temperature of about 40° C. to about 120° C.

4. The magnetic recording medium as claimed in claim 1, hwerein said inorganic particles are used in such an amount that the weight ratio of inorganic particles to the binder is 0.1 to 4.0.

5. The magnetic recording medium as claimed in claim 4, wherein said weight ratio is 0.1 to 2.5.

6. The magnetic recording medium as claimed in claim 5, wherein said weight ratio is 0.8 to 1.5.

* * * * *